(12) United States Patent
Saint-Hilaire

(10) Patent No.: US 8,099,479 B2
(45) Date of Patent: Jan. 17, 2012

(54) DISTRIBUTED MESH NETWORK

(75) Inventor: Ylian Saint-Hilaire, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 12/653,524

(22) Filed: Dec. 15, 2009

(65) Prior Publication Data

US 2011/0145381 A1   Jun. 16, 2011

(51) Int. Cl.
*G06F 15/177* (2006.01)
*G06F 15/16* (2006.01)
(52) U.S. Cl. ......... 709/220; 709/221; 709/222; 709/245
(58) Field of Classification Search .......... 709/208–211, 709/220–222, 227–229; 370/310–350
See application file for complete search history.

(56) References Cited

U.S. PATENT DOCUMENTS

| | | | |
|---|---|---|---|
| 6,519,697 B1 * | 2/2003 | Denman et al. .................... 713/1 |
| 2002/0156875 A1 * | 10/2002 | Pabla ............................ 709/220 |
| 2004/0203385 A1 * | 10/2004 | Narayanan et al. .......... 455/41.2 |
| 2004/0210657 A1 * | 10/2004 | Narayanan et al. ........... 709/227 |
| 2004/0219955 A1 | 11/2004 | DaCosta |
| 2005/0283526 A1 * | 12/2005 | O'Neal et al. ................ 709/223 |
| 2006/0168320 A1 | 7/2006 | Kidd |
| 2007/0005746 A1 | 1/2007 | Roe |
| 2007/0097895 A1 * | 5/2007 | Keshavarzian et al. ........ 370/311 |
| 2008/0049689 A1 * | 2/2008 | Nakfour et al. ............... 370/338 |
| 2009/0133096 A1 | 5/2009 | Wouhaybi |
| 2009/0147698 A1 * | 6/2009 | Potvin ........................... 370/254 |
| 2009/0252127 A1 | 10/2009 | Rangarajan et al. |
| 2010/0074173 A1 * | 3/2010 | Ewing ........................... 370/328 |

FOREIGN PATENT DOCUMENTS

EP    1313336 A2    5/2003

OTHER PUBLICATIONS

European Search Report received for European Patent Application No. 10252113.5-2416, Mailed on May 4, 2011, 3 pages.
Kazuyuki,Sakoda, Wireless LANs, Jul. 12, 2007, 20 pages.

* cited by examiner

*Primary Examiner* — Brendan Higa
(74) *Attorney, Agent, or Firm* — Derek J. Reynolds

(57) ABSTRACT

A device, method, and system are disclosed. In one embodiment a computing device resides in a mesh network. The device includes a first storage device that operates when the computing device is awake. The first storage device stores a last known list of peer computing devices in the mesh network. The device also includes a a second storage device that operates regardless of whether any central processing unit in the computing device is awake or asleep. The second storage device includes a local block that stores a list of resources provided by the first computing device and a list of computing devices in the mesh network verified by the first computing device. The second storage device also includes a remote block that stores an unverified remote list of computing devices in the mesh network.

19 Claims, 6 Drawing Sheets

DISTRIBUTED MESH NETWORK

FIELD OF THE INVENTION

This invention relates to peer-to-peer network implementations.

BACKGROUND OF THE INVENTION

A peer-to-peer distributed network generally allows network functionality without many centralized administration server requirements that other types of networks utilize. Power efficiency has become increasingly necessary on a computer by computer basis. When taking into consideration the number of computers present at a given time on a large network, processes and devices to lower power per computer can add up to significant company- and/or industry-wide power savings.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a device, method, and system to implement a distributed mesh network are described.

A distributed mesh network includes a number of peer-to-peer nodes. Each node potentially includes storage locations and logic that are available to other nodes on the mesh network whether the node is awake or asleep. When two nodes interact, they may verify to each other that they are allowed to be on the mesh network through one or more authentication procedures. The nodes may exchange information regarding the resources that each node provides as well as a list of known nodes each exchanging node is aware of on the mesh network. A first node may walk through the mesh network by retrieving a list of known nodes from each of the nodes the first node is already aware of. The first node can then contact any new nodes that the first node becomes aware of through its original known node list.

Furthermore, a third party server external to the mesh network may provide each node information about all of the other nodes on the mesh network by utilizing a designated leader node to provide a communication tunnel between the mesh network and the third party server. In many embodiments, the mesh network provides an overall network power savings with the ability to allow many of the nodes in the network to remain in a sleep state while still allowing any one node to retrieve a resource from any other node in the network. The node requesting the resource can send a request to the third party server, which can then send a wake up command through the leader node to the node that is the target of the request. The target node may then wake and provide the resource to the requesting node and then return to a sleep state.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment. In the following description and claims, the terms "include" and "comprise," along with their derivatives, may be used, and are intended to be treated as synonyms for each other.

Figure 1:
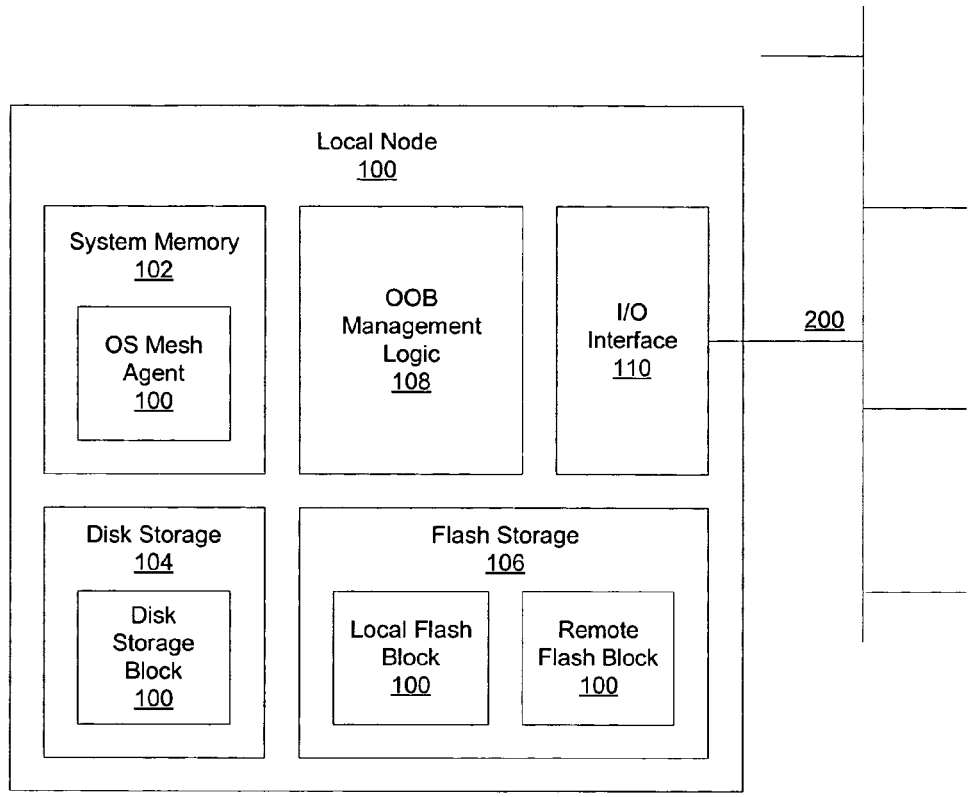
FIG. 1 illustrates an embodiment of a computing device in a mesh network.

FIG. 1 illustrates an embodiment of a computing device in a mesh network. The computer device may be referred to as a node, or more specifically as local node 100. Local node 100 may comprise some form of a computing device. For example, local node 100 may be a desktop computer, a laptop computer, a workstation computer, a server, a handheld computing device, a gaming console, a television set top box, an integrated computer in another device (e.g. a dashboard computer in an automobile), or another form of a computing device. Local node 100 includes system memory 102. System memory 102 may be a volatile memory such as dynamic random access memory (DRAM) or system memory 102 may be a non-volatile memory such as a form of flash memory.

The local node may include several types of storage such as disk storage 104 (e.g. a hard drive) and flash storage 106 (e.g. flash memory, a solid state drive, etc.). The disk storage 104 and flash storage 106 are non-volatile storage devices, which allows them to save information through multiple power cycles. In other words, when the local node is powered off or in a sleep state, the disk storage 104 and flash storage 106 may maintain information that is available the next time the local node is powered on.

In many embodiments, the local node also includes OOB (out-of-band) management logic 108. OOB management logic 108 may have circuitry that is operational when the rest of local node 100 is in a sleep state or potentially powered down. An example of OOB management logic is Intel® Active Management Technology (AMT). There are many uses for OOB management logic 108, including allowing remote access to at least a portion of local node 100 when local node 100 is not operational due to a hardware or software failure or because the local node 100 is in a sleep state, among other reasons. In many embodiments, OOB management logic 108 manages local node 100 in an out-of-band manner, which correlates to managing local node 100 during times when local node 100 is not utilizing standard in-band methods to manage itself. For example, when local node 100 is in a fully powered state and operating normally, a central processor (not shown) in local node 100 may be executing instructions for an operating system (OS) residing in system memory 102. This may be referred to as in-band operation because when a remote node communicates with local node 100, standard communication channels through the local operating system can be utilized. On the other hand, when local node 100 is in a sleep state, where the central processor is not fully powered and the operating system is not operational, the only communication available with local node 100 may be an out-of-band communication through OOB management logic 108 that is operational when the rest of local node 100 is not.

An I/O (input/output) interface 110 is utilized for communication between the local node 100 and any entity external to the node. I/O interface 110 may include one or more of a wired network interface, a wireless network interface utilizing an antenna, and/or one or more other possible network interface solutions that allows I/O communication between local node 100 and one or more other external devices. In many embodiments, I/O interface 110 is coupled to local network 200. Local network 200 may be a wired or wireless network and may or may not be coupled to the Internet.

OOB management logic 108 may take advantage of a portion or all of I/O interface 110 when local node 100 is in out-of-band mode so that communication between OOB management logic 108 and other computing devices is possible. In other embodiments, OOB management logic 108 includes a separately operational integrated I/O interface for external communication purposes.

In many embodiments, at least a portion of flash storage 106 is dedicated for use by the OOB management logic 108. Thus, flash storage 106 would be accessible for use by OOB management logic 108 during out-of-band operation, such as when the remaining portions of local node 100 are in a sleep state.

Local node 100 additionally includes a local flash block 112, a remote flash block 116, a disk storage block 118, and an OS mesh agent 114. These additional components will be explained in detail within the description of FIG. 2.

Figure 2:
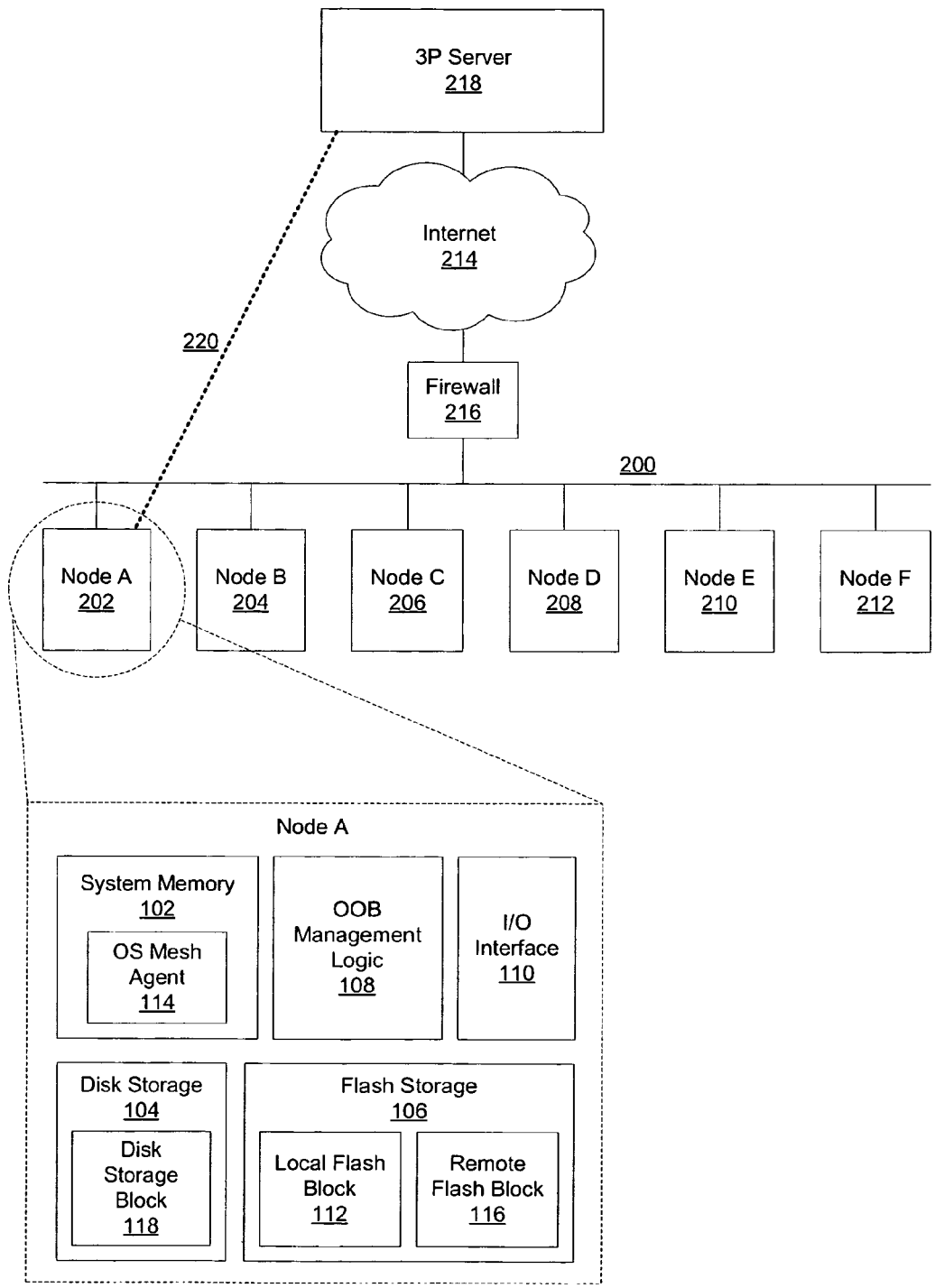
FIG. 2 illustrates an embodiment of a mesh network.

FIG. 2 illustrates an embodiment of a mesh network. The mesh network includes a set of nodes (node A 202, node B 204, node C 206, node D 208, node E 210, and node F 212).

In many embodiments, local node 100 from FIG. 1 may be any one of nodes A-F. In other words, nodes A-F may include all of the components within local node 100 detailed in FIG. 1. E.g., the detailed components of local node 100 described, in part, above are shown in the blown up detail of node A 202. The set of nodes in FIG. 2 are coupled to each other through a local network 200. The local network may be any form of communication network that allows multiple nodes to communicate with each other. Examples of local network 200 may be an Ethernet wired network, an IEEE 802.11-based wireless network, a cellular network, a wide-area wireless network such as WiMAX, or another type of network. The network may be coupled to the Internet 214 through a firewall 216. The firewall 216 may be maintained by a gateway computer on the local network 200. The gateway computer includes certain security protocols that do not allow certain types of information to be communicated between the local network 200 and the Internet 214. Thus, nodes A-F may freely communicate amongst themselves since they are all members of local network 200, but communication between any node A-F and a remote node, such as one communicatively coupled to local network 200 specifically through the Internet 214, may be limited due to security processes put in place by firewall 216.

In many embodiments, local network 200 is a distributed "mesh" network. In a mesh network all nodes within the network are not necessarily aware of all other nodes. Furthermore, there is not necessarily a centralized node within the mesh network that has information about all nodes. Each node in the mesh network keeps a list of other nodes that it knows about in the mesh network (known nodes may be referred to as acquaintance nodes). This acquaintance list may be stored within the local flash block 112 that is maintained in flash storage 106. In many embodiments, each entry in the acquaintance list includes the IP (Internet protocol) address of its acquaintances. When two nodes are aware of each other and have accepted each other as non-malicious entities, they may refer to each other as a "friend." Each node may have a unique mesh certificate that it may advertise to other nodes in the network. In many embodiments, to create a friend relationship, two nodes would need to exchange correct mesh certificates that verify they are allowed on the network. This exchange may take one of many forms, but may include authentication procedures, such as a hash algorithm that combines a public mesh certificate key with a private key provided uniquely to each node.

Conversely, if a first node is aware of a second node and yet the second node has failed to produce a mesh certificate, the first node may refer to the second node as an "enemy." Whether the second node is a friend or enemy, once the first node is aware of the second node, the second node may become the first node's acquaintance. In some embodiments, the acquaintance list maintained by a node may also include a time stamp of the last point of direct contact of each node in the list. In many embodiments, the list itself is tagged with a version number and time stamp each time the list is updated. The list may be updated to include a new node that has joined the network, to remove a node that has left the network, to change the friend/enemy status of a node, etc. Each node in the mesh network can monitor all other nodes it is aware of on its list. If a given node is not providing a mesh certificate, the other nodes that are acquaintances of this no-certificate node may include a warning about the lack of a certificate in their node acquaintance lists.

A trusted relationship between two nodes may require a security handshake utilizing the mesh certificates. In some embodiments, a node may require a mesh certificate security verification of each node that it initially becomes an acquaintance of to allow the acquaintance to be a friend. In other embodiments, a first node that has a second node as a friend, may automatically take any node that is a friend of the second node as its own friend (i.e. a friend of my friend is also my friend). This may be due to a predetermined security clearance level between friends where once a new acquaintance is verified as a new friend by one node, all other friend nodes can just assume the new acquaintance is also of friend of theirs because they utilize the same security-level mesh certificate handshake.

Figure 3:
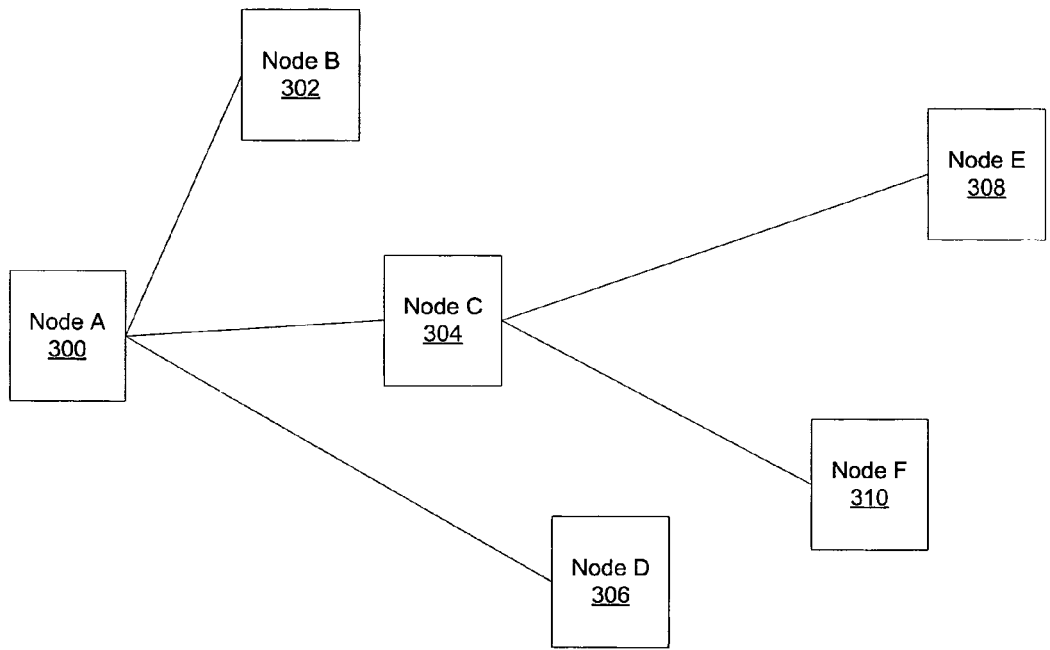
FIG. 3 illustrates an embodiment of inter-node familiarity in a mesh network.

FIG. 3 illustrates an embodiment of inter-node familiarity in a mesh network. Node A 300 knows about node B 302, node C 304, and node D 306 but does not know about node E 308 and node F 310. Although, node C 304, which is an friend of node A 300, does know node E 308 and node F 310. In this case, node A 300 may ask friend node C 304 for the information related to node E 308 and node F 310 so node A 300 can put those two nodes on its friend list of known nodes.

Returning to FIG. 2, apart from each node maintaining a list of known acquaintance nodes, each node also maintains a list of resources that it can provide to other nodes within the mesh network. The list of resources may include file meta-data such as the names, sizes, and dates of all shared files and file fragments. In other embodiments, the resources may also include lists of services and functions that a node is capable of providing in addition to file meta-data. For example, node A 202 may store certain portions of sets of data that are relevant to other nodes. This may be prevalent in a peer-to-peer file sharing environment where each node in the mesh network stores portions of the files and they list the portions they have to other nodes. In other embodiments, a given node may store whole files that it lists instead of partial files.

In many embodiments, each node includes an OS mesh agent 114. The OS mesh agent 114 may be loaded when the node is awake and fully functioning. The OS mesh agent 114 may be a process that runs in the background when the OS is operational. The OS mesh agent 114 may provide some of the same functionality as the OOB management logic 108. Thus, when the node is in a sleep state, the OOB management logic 108 performs the inter-node communication and list management and when the node is in an awake state, the OS mesh agent 114 performs the inter-node communication and list management. In many embodiments, the OS mesh agent 114 may also be loaded onto nodes that do not have OOB management logic 108, which would allow the inter-node communication to happen when the node is awake, but a node without the OOB management logic 108 would not be capable of inter-node communication while in a sleep state.

A given node may be capable of navigating through the mesh network by contacting each friend node, receiving the list of acquaintances from each friend node, and then contacting the nodes in the acquaintance lists, and so on. To do this, the OS mesh agent 114 may read the acquaintance list at each friend node maintained in the friends' respective local flash blocks. This navigation may take place whether nodes are awake or asleep because a navigating node can contact another node in the mesh network whether the other node is awake or asleep as long as the other node includes a local flash block that may be maintained in a sleep state by OOB management logic 108. In many embodiments, the OS mesh agent 114 provides local information to a visiting node in the awake state and the OOB management logic 108 provides local information to a visiting node in the sleep state. In some embodiments, both the OS mesh agent 114 and the OOB management logic 108 in a node retrieve acquaintance information as well as its own resource information from the local flash block to provide to the visiting node. In some embodiments, when the node is awake, the acquaintance and resource information may be retrieved from the local flash block 112. Thus, in many embodiments, regardless of the awake or sleep state of other nodes, a node may be capable of fully navigating the mesh network.

Furthermore, in many embodiments, when a given node navigates through the network it may leave its own list of acquaintances and its own list of resources at each node it visits. The visiting node may place this information (resources and acquaintances) in the remote flash block 116 in the flash storage 106 of the node being visited. In some embodiments, when the node being visited is sleeping, this information may sit in the remote flash block 116 undisturbed until the visited node wakes up.

Once awake, the OS mesh agent 114 of the node that was visited may read the remote flash block 116 and process the information deposited by the visiting node. During this process, the OS mesh agent 114 may verify the information deposited by the visiting node by comparing the list of acquaintances that was left by the visiting node. The acquaintances that are common among both lists have already been verified by the local node. If the visiting node has acquaintances not present in the local node's own list of acquaintances, an extra process may be undertaken to verify these unknown acquaintance nodes. Specifically, if one or more acquaintance nodes are present in the visiting node's acquaintance list that are not present in the acquaintance list maintained in the local node's own local flash block 112, the OS mesh agent 114 may contact the unknown acquaintance(s) and perform a mesh certificate exchange with these new node(s) so the one or more new nodes may be added to the local list of acquaintance nodes stored in the local flash block 112.

Additionally, the resource information of the new acquaintance node(s) may also be utilized by the OS mesh agent 114. The disk storage block 118 stored in local disk storage 104 may store all known information for all known nodes in the mesh network 200. For example, the disk storage block 118 may include the IP addresses of each known node as well as a list of resources per node. In many embodiments, other information per node may be stored as well. For example, an average network ping latency to each acquaintance node may be stored. Every so often the OS mesh agent 114 in a given node (while the node is awake) may perform a maintenance update to its known information of the nodes in the mesh network 200. This entails contacting each of the nodes in its own acquaintance list to update the information it maintains regarding each of the acquaintance nodes. Some information related to other nodes may be obtained from information a visiting node stores in the remote flash block 116. Other information related to other nodes may be obtained directly from other nodes in the mesh network when the OS mesh agent 114 proactively makes contact with another node.

For a given node, the acquaintance information stored in its local flash block 112 and/or disk storage block 118 may be compared against the acquaintance information stored by visiting nodes in the remote flash block each time the node wakes up from a sleep state if a list deposited by a visiting node includes the IP address of a new node (i.e. the new node is not part of the list of acquaintance nodes that is maintained by the OS mesh agent 114), the OS mesh agent 114 may contact the new node and perform a mesh certificate exchange with the new node to certify the new node and add it to the local list of acquaintance nodes.

In many embodiments, a third party (3P) server 218 is coupled to the Internet 214. The 3P server 218 may maintain a list of all nodes in the mesh network, including their IP addresses and the resources that each node provides. The 3P server 218 is outside the firewall 216, thus there may be a very limited amount of information that can be communicated between any given node in the mesh network 200 and the server. To remedy this firewall communication issue, in many embodiments, the mesh network 200 includes a leader node. The leader node may be any given node in the network. In many embodiments, the OS mesh agent 114 and/or the OOB management logic 108, which are located in all (or at least many) nodes in the network, may all include additional leader logic to allow these nodes to be promoted to leader status. When a node is promoted to leader (e.g. node A 200) it may create a two-way communication tunnel 220 with the 3P server 218. The two-way communication tunnel is capable of bypassing the security limitations imposed by the firewall 216, which allows the leader node to freely communicate with the 3P server 218.

In some embodiments, the leader logic may include a capability of waking up a given node in the mesh network. Conversely, nodes other than the leader may not have this ability.

As stated above, the 3P server 218 stores a list of all the nodes in the mesh network 200 as well as list of resources each node provides. This information may be freely read by any node in the network. For example, this information stored by the 3P server 218 may be read as a simple HTML (hypertext markup language) file, which generally is acceptable information to be read through the firewall 216.

Furthermore, a given node (e.g. node C 206) may have found a resource list maintained by another node (e.g. node E 210) in the mesh network 200 that includes a resource node C 206 needs access to. The resource list of node E 210 may be maintained in a local flash block in node E 210. The resource list of node E 210 may also be maintained by the 3P server

218. Node C 206 may send a request communication to the 3P server 218 to wake up node E 210 so node C 206 can obtain the needed resource that is listed. In many embodiments, the 3P server may send a wake up request for node C 206 to node A 202 through the established two-way communication tunnel 220. Leader node A 202 may receive this request and then directly contact node E 210 within the mesh network 200 and cause node E 210 to wake up. Furthermore, leader node A 202 may send a resource request to node E 210 to tell node E 210 to provide the needed resource to the original resource requestor, node C 206.

This communication and control process may be performed by the leader node regarding any node in the network when the two-way communication tunnel 220 has been established. Although the 3P server 218 may not be capable of making this request directly to the target node due to firewall 216 security processes, the 3P server 218 can make this request through the leader node using the two-way communication tunnel.

The list of acquaintance nodes maintained by each node in the mesh network 200, within each respective node's local flash block, may also include additional information stating which node in the list is the leader node. The OS mesh agent 114 and/or OOB management logic 108 may maintain the IP address of the 3P server 218 to retrieve a complete list of the nodes in the mesh network 200, including the leader. Due to certain circumstances, a leader node may not be present. For example, if the leader node is disconnected from the mesh network 200 for some reason, there would then be no leader node present in the mesh network 200. In these situations, a node that contacts the 3P server 218 may be automatically promoted to the leader node. This would only be possible from nodes that have leader logic present. The 3P server 218 may continuously monitor the two-way communication tunnel, and if this tunnel is interrupted, the 3P server 218 may set a flag (e.g. a "leader position available" flag) that tells the next node contacting the 3P server 218 to elevate itself to the leader node. At this time, the first node (e.g. node B 204) to contact the 3P server 218 would see the flag and elevate itself to the leader. The elevation to leader would give node B 204 the ability to wake up other nodes through wake up requests. Additionally, the elevation to leader status would cause node B 204 to establish a new two-way communication tunnel with the 3P server 218.

When a new node is added to the mesh network, the node may declare itself to other local nodes through a broadcast message on the mesh network. Then at least one node in the mesh network may contact the new node to perform a security authentication procedure for admission to the network. The new node may then begin to walk through the mesh network using the acquaintance list of the node that made contact. Alternatively, the new node may simply be provided the IP address of a local node in the mesh network or the IP address of the 3P server by network administration. If the 3P server IP address is provided, the new node may retrieve the IP address of a local node from the 3P server. The new node may then go through the initial mesh certificate exchange authentication procedure with the local node. In many embodiments, the OOB management logic may be disabled in new nodes by default. Thus, the local node that is the first node in the mesh network to come in contact with the newly arrived node may create an initial trusted connection that may be required for initial set up of the OOB management logic in the newly arrived node. The initial setup may require a security handshake utilizing one or more public and private keys to verify the authenticity of the newly arrived node (as well as the authenticity of the local node in the mesh network). Once the trusted connection has been established with the local node in the mesh network, the OOB management logic may then be enabled and the newly arrived node may then begin to walk through the mesh network to gather information about other nodes.

Figure 4:
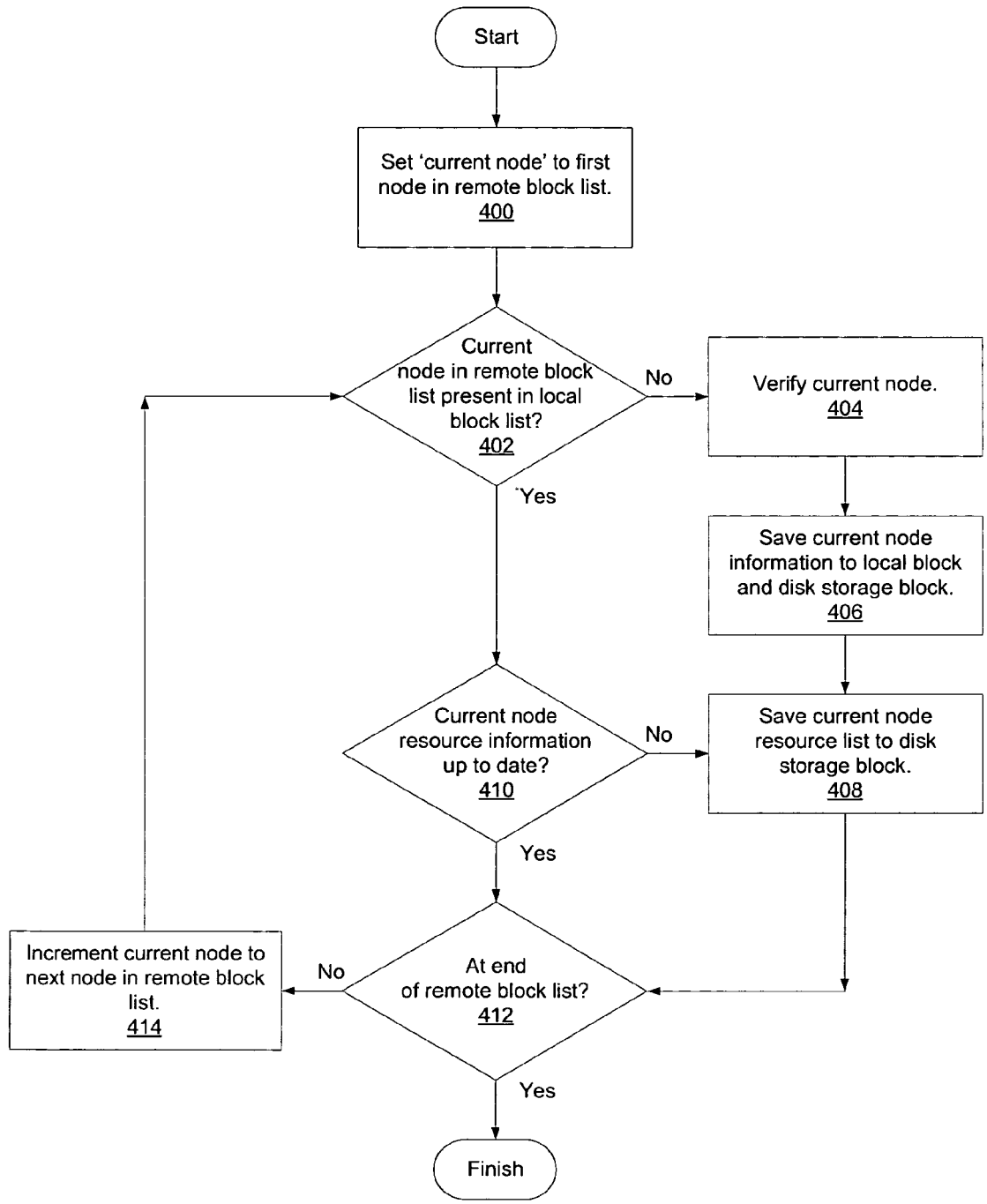
FIG. 4 is a flow diagram of an embodiment of a process to update a local node's mesh network information.

FIG. 4 is a flow diagram of an embodiment of a process to update a local node's mesh network information.

The process is performed by processing logic which may include hardware (e.g., circuitry in a general purpose computer), software (e.g., OS or software application code), firmware (e.g., microcode or basic input/output system (BIOS) code), or a combination of any two or more of these forms of processing logic. In many embodiments, processing logic for FIG. 4 is located within a local node of a mesh network. The process also assumes that another node in the mesh network has stored its list of acquaintances into the local node's remote block. The process begins by processing logic setting a 'current node' variable to point to the first node in a list of acquaintances stored within the local node's remote block (processing block 400).

Next, processing logic determines if the current node in the remote block acquaintance list is also present in the local block acquaintance list (processing block 402). If the current node is not present (i.e. the local node is not aware of the current node), then processing logic attempts to verify the current node (processing block 404). The verification procedure can be one of many types of procedures to verify/authenticate a node in different embodiments. One example of a verification procedure is described below in FIG. 5.

Assuming the verification procedure is successfully completed between the local node and the current node, processing logic may then save the current node's information to its own local block acquaintance list and to its disk storage block (processing block 406). This information may include the IP address of the current node, a timestamp as to when the verification was completed, among other information items. Then processing logic can save the current node's resource list to its own disk storage block (processing block 408). For example, the resource list may include the meta-data for all files and partial files that the current node is providing to the mesh network. Then processing logic determines if the remote block acquaintance list it is processing is at the end of the list or if there are additional nodes in the list (processing block 412). If the list is at the end, then processing the list is finished. Otherwise, if the list is not at the end then processing logic increments the current node to the next node in the list (processing block 414) and returns to block 402 to continue the process.

Returning to block 402, if the current node is in the local node's local block acquaintance list (i.e. the local node is already aware of the current node), then processing logic determines whether the current node's resource information stored in the local node's disk storage block, is up to date (processing block 410). For example, the resource information may be a list that contains a timestamp signifying the exact time the resource information list was last updated by the current node. Thus, if the current node updates any resource in the resource information list it is providing to other nodes in its local block storage location, the timestamp for the entire list is also updated. The resource information list is stored in other nodes (in their disk storage blocks) along with the timestamp. When, for example, the local node wants to check to see if any of the current node's resource information has changed in the list the local node stores in its disk storage block, the local node can compare its stored timestamp against the timestamp currently provided by the current node in the current node's local block. When these two timestamps are the same, the local node knows it has the current resource information list. When the timestamps differ, the local node knows it has an out of date resource information list.

If the resource information list is not up to date, then processing logic saves the current node resource list to its own disk storage block (processing block 408). Then processing logic determines if the remote block acquaintance list it is processing is at the end of the list or if there are additional nodes in the list (processing block 412). If the list is at the end, then processing the list is finished. Otherwise, if the list is not at the end then processing logic increments the current node to the next node in the list (processing block 414) and returns to block 402 to continue the process.

Returning to block 410, if the resource information list is up to date, then processing logic determines if the remote block acquaintance list it is processing is at the end of the list or if there are additional nodes in the list (processing block 412). If the list is at the end, then processing the list is finished. Otherwise, if the list is not at the end then processing logic increments the current node to the next node in the list (processing block 414) and returns to block 402 to continue the process.

Figure 5:
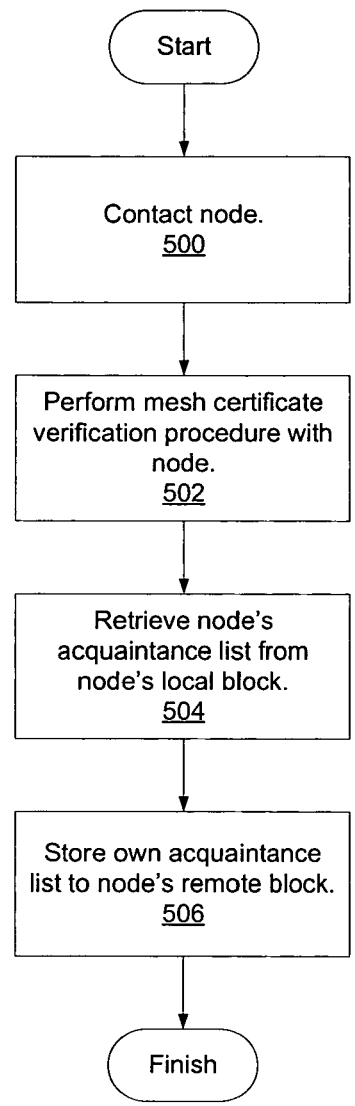
FIG. 5 is a flow diagram of an embodiment of a process of a local node to verify another node in a mesh network and then exchange relevant mesh network information with the other node.

FIG. 5 is a flow diagram of an embodiment of a process of a local node to verify another node in a mesh network and then exchange relevant mesh network information with the other node.

The process is performed by processing logic which may include hardware (e.g., circuitry in a general purpose computer), software (e.g., OS or software application code), firmware (e.g., microcode or basic input/output system (BIOS) code), or a combination of any two or more of these forms of processing logic. In many embodiments, processing logic for FIG. 5 is located within a local node of a mesh network.

The process begins by processing logic in the local node (e.g., a first node) contacting another node (e.g., a second node) in the mesh network (processing block 500). The process of "contacting" requires the first node to have the IP address (or potentially another type of address that provides location information) of the second node. Once contact is made, processing logic in the first node may perform a mesh certificate verification procedure with the second node (processing block 502). The mesh certificate verification procedure may include the first node providing its mesh certificate to the second node and the second node providing its mesh certificate to the first node. Once the verification procedure has completed, assuming the verification procedure has been successful, processing logic in the first node may then retrieve the second node's acquaintance list from the second node's local block storage location (processing block 504).

Finally, processing logic stores the first node's own acquaintance list in the second node's remote block (processing block 506). This allows the first node's known acquaintance information to be propagated to the second node. After this entire procedure, both the first node and second node have the combined acquaintance information of what each node had separately prior to the procedure.

Figure 6:
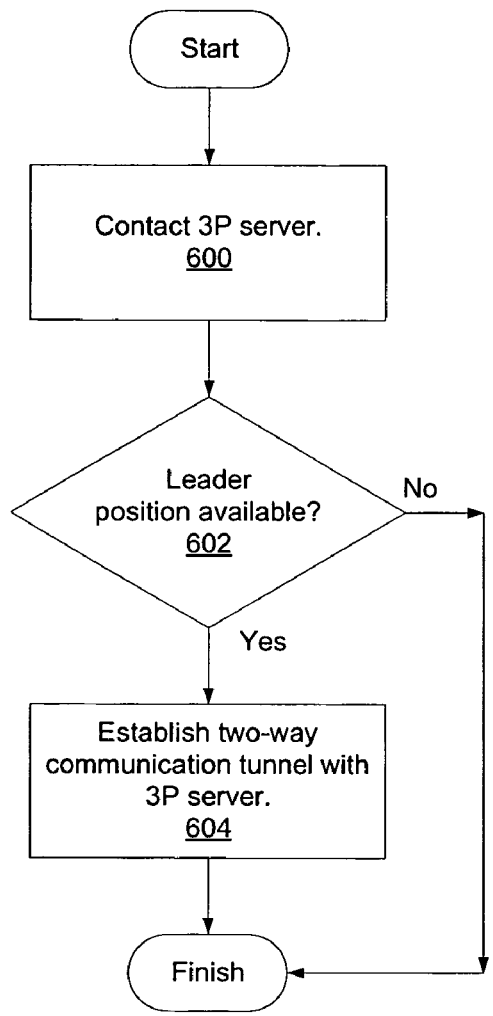
FIG. 6 is a flow diagram of an embodiment of a process of a local node to contact a third party server and potentially be upgraded to a leader node by the third party server.

FIG. 6 is a flow diagram of an embodiment of a process of a local node to contact a third party server and potentially be upgraded to a leader node by the third party server.

The process is performed by processing logic which may include hardware (e.g., circuitry in a general purpose computer), software (e.g., OS or software application code), firmware (e.g., microcode or basic input/output system (BIOS) code), or a combination of any two or more of these forms of processing logic. In many embodiments, processing logic for FIG. 6 is located within a local node of a mesh network.

The process begins by processing logic within the local node contacting the third party server (processing block 600). The IP address of the third party server may be provided to the local node by another node within the mesh network or potentially by mesh network administration. Next, processing logic inquires with the third party server if the leader position in the mesh network is available (processing block 602). The leader position may be available when the third party server sets a globally visible flag that states the position is available. If the leader position is available and the local node has the capability to upgrade itself to the leader, then the local node establishes a dedicated two-way communication tunnel with the third party server (processing block 604). The dedicated tunnel allows the local node to receive detailed information and commands from the third party server. Without the tunnel it may be impossible for a local node to receive commands from the third party server due to a firewall or other security procedures implemented for the mesh network. In many embodiments, a secure verification procedure may take place between the local node and the third party server to authenticate each other prior to establishing the tunnel. If the leader position is not available, then the process is finished (i.e., another node in the mesh network has already been established as the leader and the other node is currently operational).

Thus, embodiments of a device, method, and system to implement a distributed mesh network are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

I claim:

1. A first computing device in a mesh network, comprising:
a first storage device that operates when the first computing device is awake, the first storage device to store a last known list of peer computing devices in the mesh network; and
a second storage device that operates regardless of whether any central processing unit in the computing device is awake or asleep, the second storage device comprising at least
a local block that stores a list of resources provided by the first computing device and a first list of computing devices in the mesh network verified by the first computing device; and
a remote block that stores an unverified remote list of computing devices in the mesh network.

2. The first computing device of claim 1, wherein the list of unverified computing devices comprises a local copy of a remote list of known computing devices provided by a second computing device in the mesh network.

3. The first computing device of claim 2, further configured to:
upon the first computing device waking up from a sleep state, compare the first list of verified computing devices in the mesh network stored in the first computing device's local block with the remote list of known computing devices stored in the first computing device's remote block;
verify any computing device stored in the list in the first computing device's remote block that is not stored in the list in the first computing device's local block; and update the list of verified computing devices in the first computing device's local block with any newly verified computing devices from list in the first computing device's remote block.

4. The first computing device of claim 3, further configured to:
update the last known list of peer computing devices in the first storage device with any newly verified computing devices updated in the list of verified computing devices.

5. The first computing device of claim 1, further configured to:
for each peer computing device in the list of last known peer computing devices in the mesh network stored in the first storage device, additionally store a list of resources each peer computing device provides.

6. The first computing device of claim 1, further configured to:
contact a second computing device in the list of verified computing devices in the first computing device's local block;
read a second list of computing devices stored in the second computing device's local block verified by the second computing device; and
store the first list of verified computing devices in the second computing device's remote block.

7. The first computing device of claim 6, further configured to:
provide to the second computing device a first mesh certificate designated for the first computing device to allow the second computing device to securely verify the authenticity of the first computing device; and
receive from the second computing device a second mesh certificate designated for the second computing device to allow the first computing to securely verify the authenticity of the second computing device.

8. The first computing device of claim 1, further configured to:
be designated a leader of the mesh network of computing devices, wherein the leader computing device establishes a two-way communication tunnel with a remote server external to the mesh network.

9. The first computing device of claim 8, further configured to:
wake up a second computing device in the mesh network at the request of the remote server.

10. The first computing device of claim 8, further configured to:
read a leader position available flag on the remote server;
establish the two-way communication tunnel with the remote server in response to the flag being set; and
remain in non-two-way communication with the remote server in response to the flag not being set.

11. The first computing device of claim 1, further configured to:
establish a trusted connection with a second computing device newly coupled to the mesh network, wherein the trusted connection enables an out-of-band management logic on the second computing device.

12. A method, comprising:
storing, in a local block of a storage device that is located in a first computing device, a list of resources provided by the first computing device to a mesh network and a first list of computing devices in a mesh network verified by the first computing device;
storing, in a remote block of the storage device, an unverified remote list of computing devices in the mesh network, wherein the list of unverified computing devices comprises a local copy of a remote list of known computing devices provided by a second computing device in the mesh network;
upon the first computing device waking up from a sleep state, comparing the first list of verified computing devices in the mesh network stored in the first computing device's local block with the remote list of known computing devices stored in the first computing device's remote block;
verifying any computing device stored in the list in the first computing device's remote block that is not stored in the list in the first computing device's local block; and
updating the list of verified computing devices in the first computing device's local block with any newly verified computing devices from list in the first computing device's remote block.

13. The method of claim 12, further comprising:
contacting a second computing device in the list of verified computing devices in the first computing device's local block;
reading a second list of computing devices stored in the second computing device's local block verified by the second computing device; and
storing the first list of verified computing devices in the second computing device's remote block.

14. The method of claim 12, further comprising:
providing to the second computing device a first mesh certificate designated for the first computing device to allow the second computing device to securely verify the authenticity of the first computing device; and
receiving from the second computing device a second mesh certificate designated for the second computing device to allow the first computing to securely verify the authenticity of the second computing device.

15. The method of claim 12, further comprising:
designating the first computing device a leader of the mesh network of computing devices, wherein the leader computing device establishes a two-way communication tunnel with a remote server external to the mesh network.

16. A system, comprising:
a mesh network of computing devices including a first computing device, the first computing device comprising
a mass storage device that operates when the computing device is awake or asleep, the mass storage device to store a last known local list of peer computing devices in the mesh network; and
a flash memory that operates regardless of whether the computing device is awake or asleep, the flash memory comprising at least
a local block that stores a list of resources provided by the first computer and a first list of computer devices in the mesh network verified by the first computing device; and
a remote block that stores a list of unverified computer devices in the mesh network; and
a remote server that
stores a global list of peer computing devices in the mesh network; and
designates one of the computing devices in the mesh network as a leader computing device.

17. The system of claim 16, wherein the list of unverified computing devices comprises a local copy of a remote list of known computing devices provided by a second computing device in the mesh network.

18. The system of claim 17, wherein the first computing device is further configured to:
   upon waking up from a sleep state, compare the first list of verified computing devices in the mesh network stored in the first computing device's local block with the remote list of known computing devices stored in the first computing device's remote block;
   verify any computing device stored in the list in the first computing device's remote block that is not stored in the list in the first computing device's local block; and
   update the list of verified computing devices in the first computing device's local block with any newly verified computing devices from list in the first computing device's remote block.

19. The system of claim 16, wherein the first computing device is further configured to:
   contact a second computing device in the list of verified computing devices in the first computing device's local block;
   read a second list of computing devices stored in the second computing device's local block verified by the second computing device; and
   store the first list of verified computing devices in the second computing device's remote block.

* * * * *